United States Patent [19]
McClung

[11] 3,906,643
[45] Sept. 23, 1975

[54] VOR INSTRUCTION DEVICE
[75] Inventor: Lonnie D. McClung, Fairbanks, Alaska
[73] Assignee: L.D.M., Inc., Fairbanks, Alaska
[22] Filed: Nov. 5, 1973
[21] Appl. No.: 412,900

Related U.S. Application Data
[63] Continuation-in-part of Ser. No. 316,473, Dec. 19, 1972, abandoned.

[52] U.S. Cl. .................. 35/10.2; 35/12 N; 35/12 F
[51] Int. Cl.² .................... G01C 21/00; G09B 9/08
[58] Field of Search ...... 35/10.2, 12 F, 12 W, 12 N, 35/12 R

[56] References Cited
UNITED STATES PATENTS
3,364,297  11/1968  Osborne, Jr. .................. 35/10.2

Primary Examiner—Malcolm A. Morrison
Assistant Examiner—Errol A. Krass
Attorney, Agent, or Firm—Christensen, O'Connor, Garrison & Havelka

[57] ABSTRACT

An entirely mechanical VOR instruction device suitable for use in training pilots and student pilots in the use of VOR equipment is disclosed. An OBS control knob through a first mechanical linkage controls a course selector dial, a to/from indicator, and a right-/left indicator. In addition, an aircraft position simulator arm, through a second mechanical linkage, controls the to/from indicator and the right/left indicator. In operation, after the device is initially set up, movement of the aircraft position simulator arm causes movement of the to/from indicator and the right/left indicator to provide a true representation of the changes that would occur to related indicators of an actual VOR receiver mounted in an aircraft moving in the same radial manner as the aircraft position simulator arm is moved. In addition, the OBS control knob can be rotated to provide an indication of what effects such rotation has on the to/from indicator and the right/left indicator to correct for aircraft movement.

19 Claims, 30 Drawing Figures

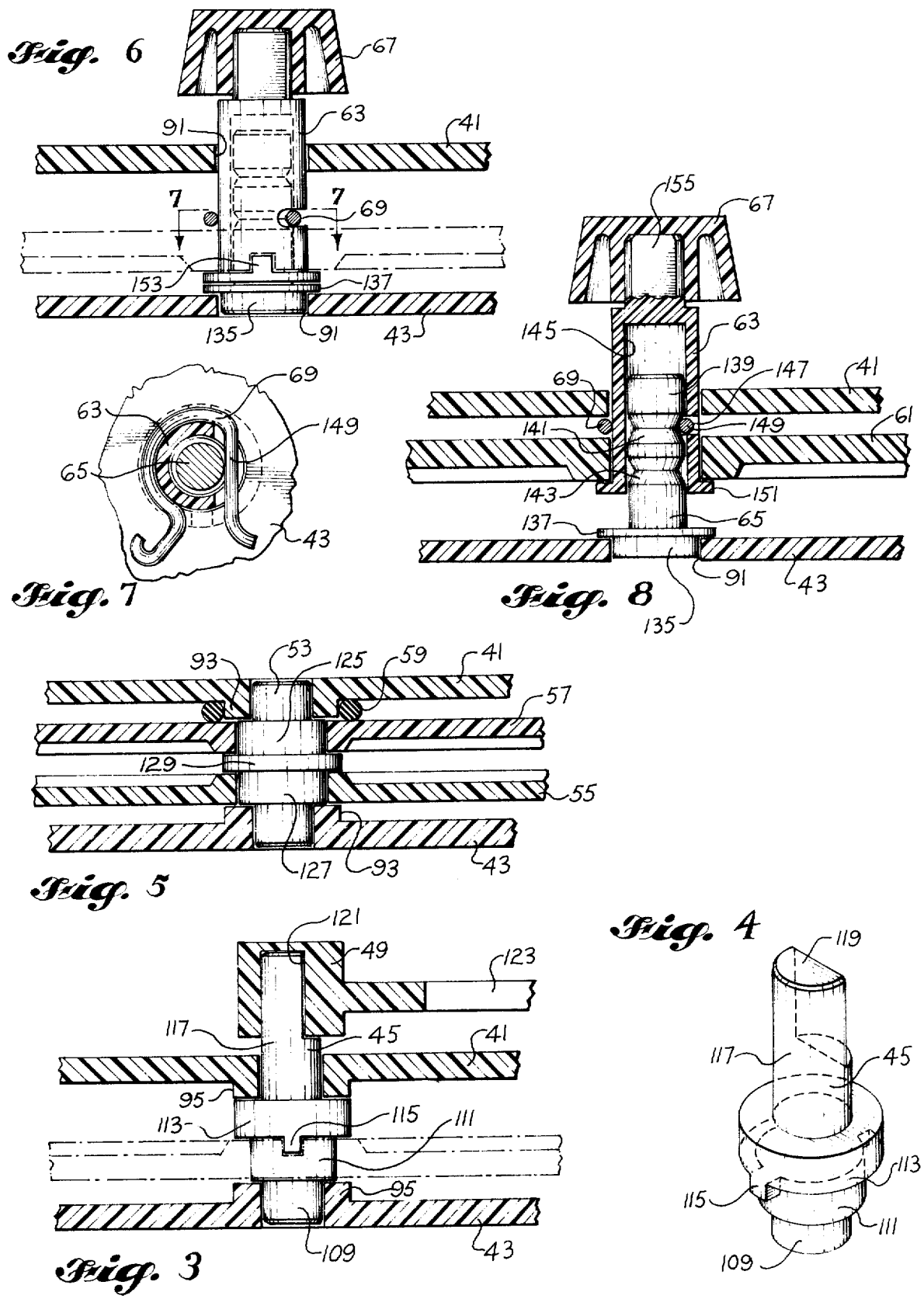

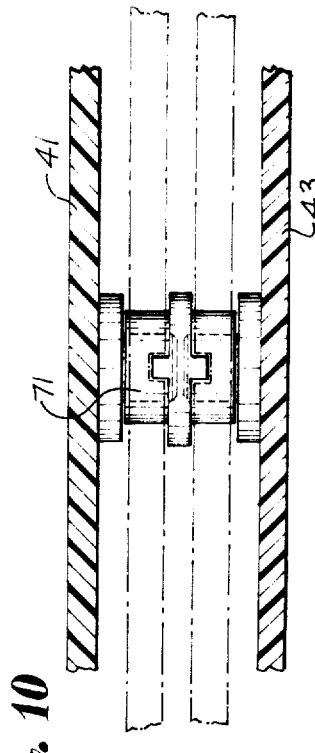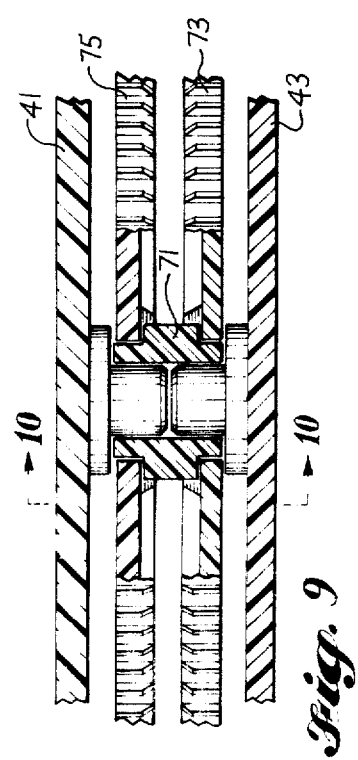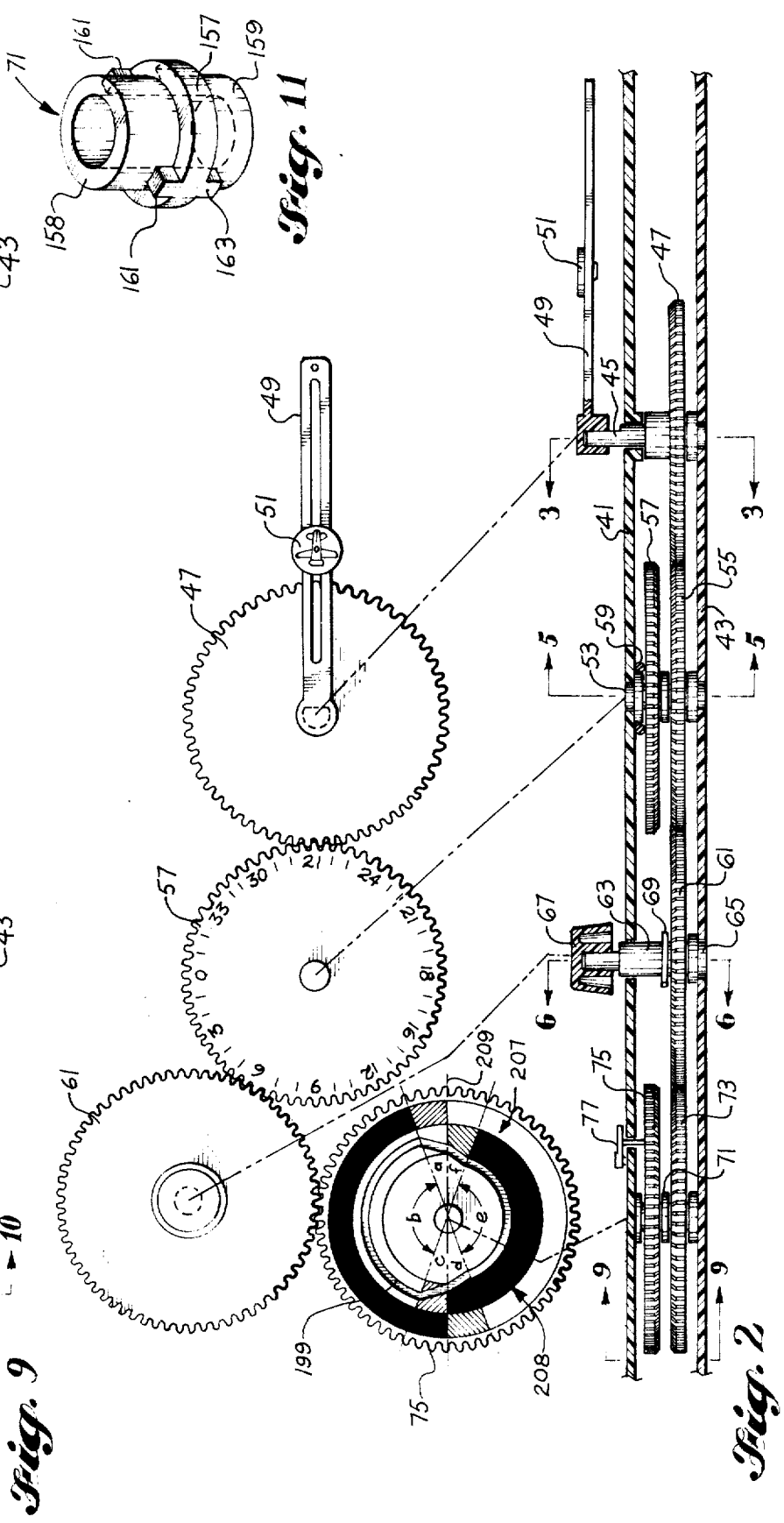

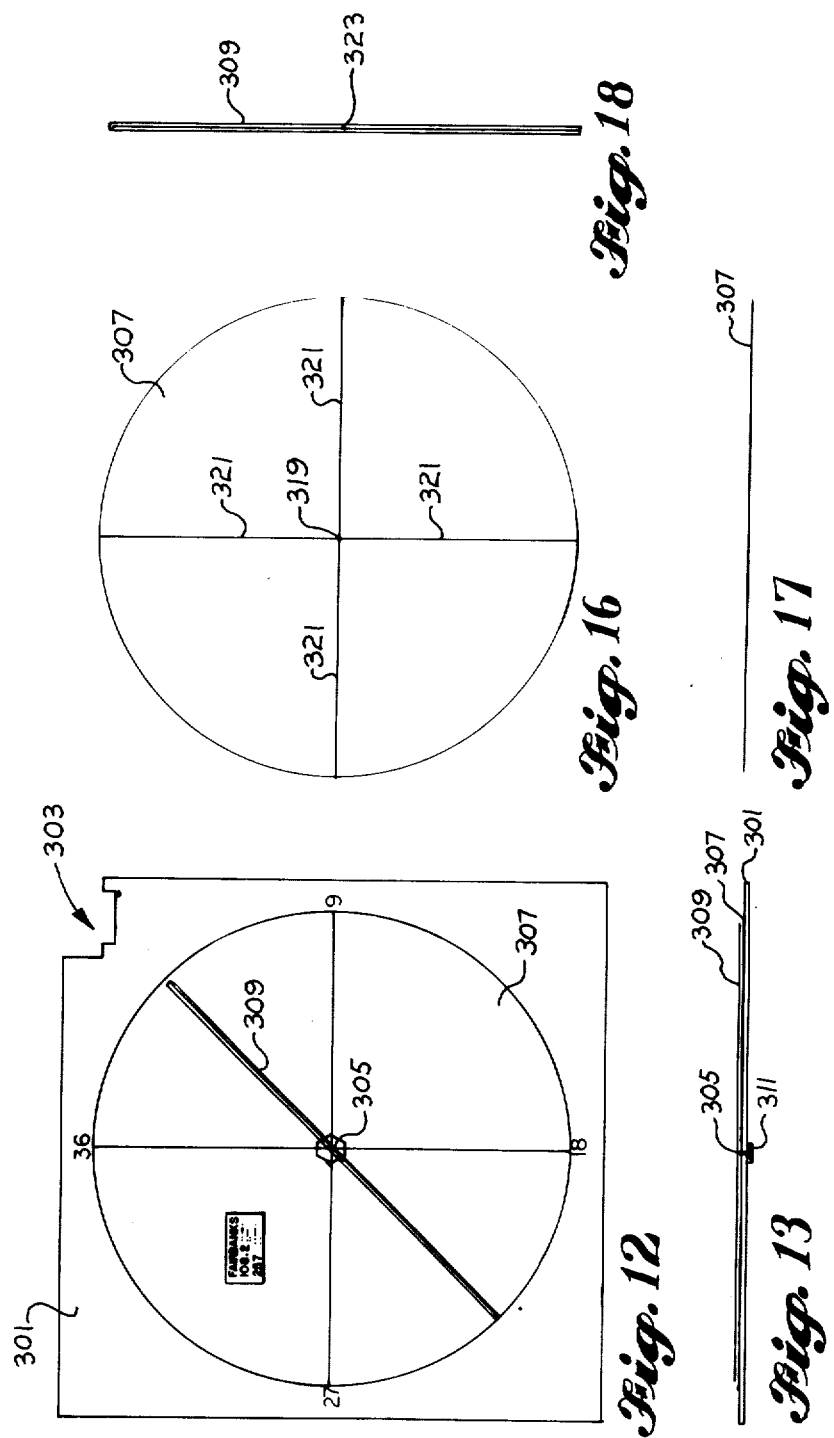

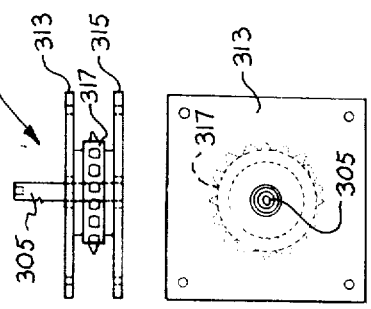
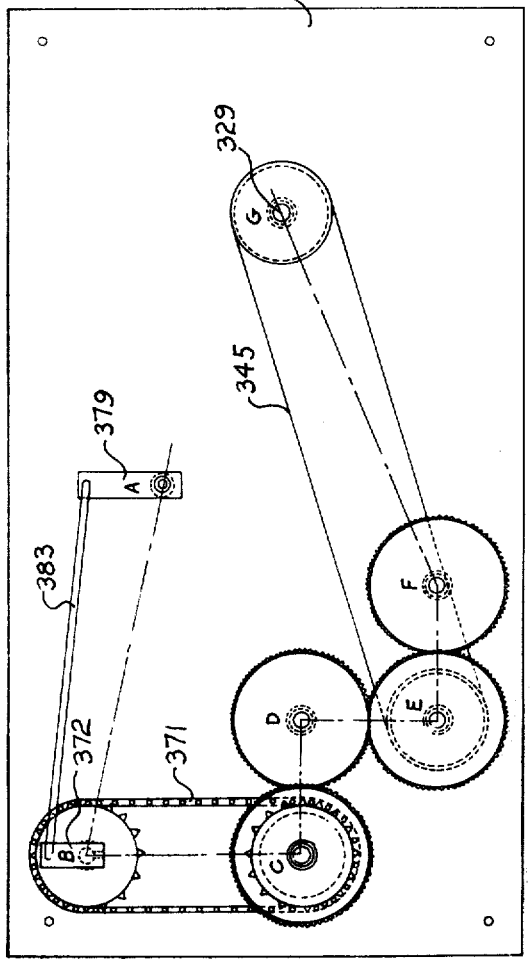
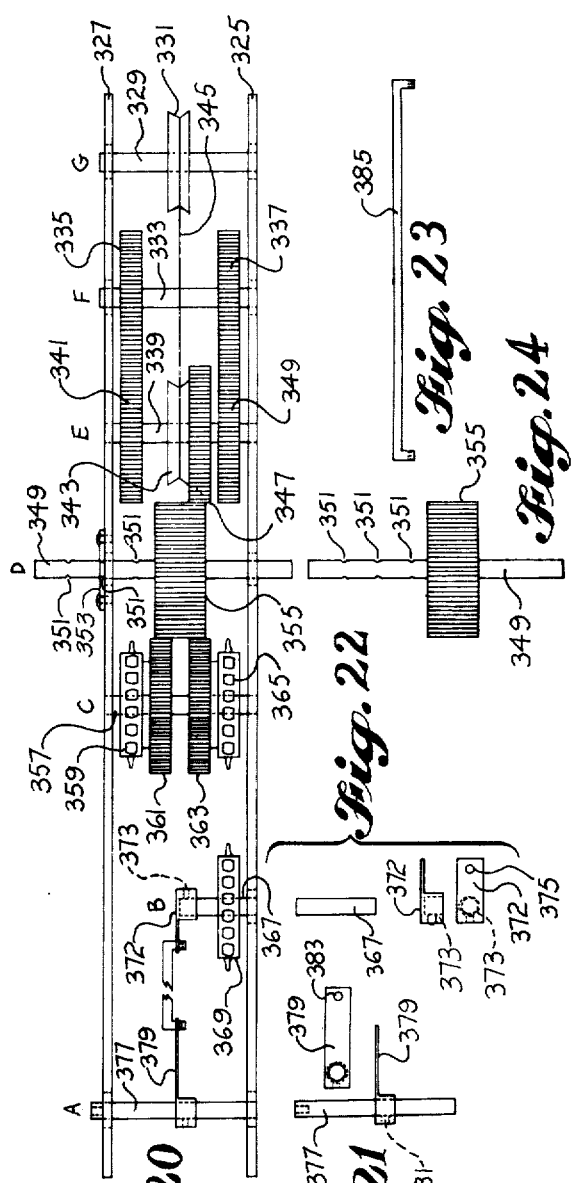

VOR INSTRUCTION DEVICE

CROSS-REFERENCE TO RELATED APPLICATION

This application is a continuation-in-part of U.S. Pat. Application Ser. No. 316,473, filed Dec. 19, 1972, now abandoned, by Lonnie D. McClung for "VOR Simulator".

BACKGROUND OF THE INVENTION

This invention is directed to pilot and student pilot instruction devices and more particularly to an instruction device suitable for teaching pilots radio navigation.

In the United States, and in most other nations where there is substantial aeronautical activity, radio navigation is rapidly becoming the primary means of setting an aircraft course and establishing its position. That is, in the past, private pilots have relied more on visual identification of landmarks for getting from one place to another than they have relied on radio navigation. Now they are becoming more and more dependent upon radio navigation. In fact, the Federal Aviation Agency now requires that all pilots demonstrate the ability to use radio navigation techniques.

One of the primary radio navigation systems utilized by private aircraft, particularly in the United States, is the very high frequency omnidirectional radio range (VOR). VOR comprises a plurality of transmitters located at various ground positions. These omnirange transmitters continuously send out radio waves in all directions of the compass, producing courses (radials) which radiate out like spokes from the hub of a wheel. This continuously generated directional information is available for reception by aircraft. The aircraft receives the transmitted signals and converts them into visual indications suitable for use by the pilot.

VOR is based on a comparison of the phase difference between two radiated audio-frequency signals, the difference in phase being related to changes in azimuth. One of these signals is nondirectional (omnidirectional). The omnidirectional signal has a constant phase throughout its 360° of azimuth and is called the reference phase. The second or variable phase signal rotates at a speed of 1,800 rpm, and varies in phase with the azimuth. Generally, the reference phase signal is radiated from the center antenna of a five element group. The variable phase signal is produced by a group of four stationary antennas connected in pairs to a motor driven goniometer, or inductor. As the goniometer revolves, RF voltage is fed to pairs of antennas. The RF voltage varies sinusoidally at the rate of 30 cycles per second to produce a rotating field.

In essence, the airborne receiver receives the two signals and measures the time between the reception of the omnidirection or reference phase and the reception of the variable phase. This time difference is related to the position of the aircraft with respect to the location of the omnirange transmitter. More specifically, the rotating signal is set so that at magnetic north the reference and variable phase signals are exactly in phase. In all other directions the positive maximum of the variable phase signal occurs at some time later than the maximum of the reference phase signal. The fraction of the cycle which elapses between the occurrence of the two maximums, at any point in azimuth, identifies the azimuth angle of that point.

In addition to position information, the signals generated by the omnirange transmitter also contain identification information, such as a morse code and/or an alphabet code related to the particular transmitter. These signals are received by an audio receiver forming part of the airborne VOR receiver and are utilized to additionally identify, for the pilot, the particular transmitter signal being received. Of course, each transmitter operates on a different frequency also.

The VOR receiver is used by the pilot in the following manner; initially the pilot tunes the receiver to the frequency of the transmitter whose reference and variable phase signals he desires to receive and audibly identifies the transmitter. He then turns his omnibearing selector (OBS) dial until he has a to or from indication on his to/from indicator, and his right/left (course deviation) indicator is centered. The reading on the OBS dial provides him with information regarding the location (magnetic compass radial) that he is on with respect to the VOR transmitter. If his to/from indicator provides a "to" indication, the OBS reading can be used as a compass heading for flying to the transmitter. If his indicator has a "from" indication, the OBS reading can be used as a compass heading for flying from the transmitter. In a variety of similar manners the VOR receiver can be used for triangulation purposes, interception of a desired radial, etc., all well known to pilots familiar with radio navigation.

It will be appreciated from the foregoing brief discussion of the omnirange system that it is desirable, in fact it is necessary, in many circumstances for pilots to utilize this navigation system. Thus, it is necessary, in fact it is mandatory, that pilots be trained in the use of VOR. While such training could be performed in flight during actual flight training, it will be appreciated that such training will be expensive because an aircraft is being utilized to, in essence, provide the "classroom" for such training. On the other hand, training in radio navigation will be considerably less expensive if at least the basic information necessary to understand radio navigation is taught in a ground school prior to actual use in an aircraft. Such training, however, has certain problems associated with it. For example, while the basic concept of radio navigation and its utilization can be described to a student pilot in a manner similar to that set forth above, it is difficult for many student pilots to understand the actual use of a VOR receiver because they lack the technical background necessary to understand the operation of electronic equipment. That is, many student pilots are businessmen, lawyers, doctors, etc., who have no training in the use of radio receivers any more complicated than a standard AM or FM broadcast receiver. They have trouble understanding the information generated by a radio receiver where the information is visual rather than audio.

In addition to student pilots, licensed pilots also need training in the advanced use of VOR equipment, such advance use encompassing shooting approaches, entering holding patterns, following holding patterns, procedure turns, teardrop turns, etc. While licensed pilots can practice VOR utilizing an aircraft, such an approach is considerably more expensive than desirable. Much of the expense of such practice can be eliminated if the practice can be performed outside of the cockpit, such as in the pilots home, for example.

Thus, it is desirable to provide a device which simulates the different indications provided by a VOR receiver. Moreover, it is desirable that such a device be inexpensive to manufacture and use whereby it is suitable for purchase on an individual basis by both pilots and student pilots. It is also desirable to provide a larger model of such a device that is suitable for use in a classroom for general display/instruction purposes.

Therefore, it is an object of this invention to provide a VOR instructional device.

It is a further object of this invention to provide a VOR instructional device that is inexpensive to manufacture and, therefore, suitable for widespread use.

While a variety of prior art devices directed to assisting students in the understanding of VOR and/or the use of VOR receivers have been suggested, these devices have not been entirely satisfactory for a variety of reasons. In many cases, these devices are overly complicated. In other cases, the end result is not a true simulation of a VOR receiver, thus, more generally, not a simulation of VOR. Other devices, while somewhat less complicated, do not provide a complete instruction device because they do not display simulated aircraft movement as well as simulated VOR indications. In this regard, reference is hereby made to U.S. Pat. No. 3,364,297 issued to Robert W. Osborne, Jr., for "MECHANICAL SIMULATOR". While the Osborne device appears to be somewhat satisfactory and overcomes many of the problems of previously developed prior art systems, it does not provide a display illustrating the movement of an aircraft that causes variations in a VOR receiver display.

Therefore, it is also an object of this invention to provide a VOR instructional device wherein a VOR receiver display changes as a simulated aircraft changes position with respect to the simulated location of a VOR transmitter.

SUMMARY OF THE INVENTION

In accordance with principles of this invention, an entirely mechanical VOR instructional device suitable for use in training pilots in the use of VOR receivers is disclosed. An omni-bearing selector (OBS) control knob, through a first mechanical linkage, controls a course selector dial, a to/from indicator, and a right/left or course deviation indicator. An aircraft position simulator arm, through a second mechanical linkage, controls the to/from indicator and the right/left indicator. Initially, the OBS control knob sets a predetermined directional setting and the aircraft position simulator arm is set along a corresponding radial. Thereafter, movement of the aircraft position simulator arm through various radials changes the information provided by the to/from indicator and the right/left indicator. These changes are a true representation of the changes that would occur on the related indicators of an actual VOR receiver mounted in an aircraft radially moving in the same manner as the aircraft position simulator arm is moved.

In accordance with further principles of this invention, after the aircraft position simulator arm has been moved to any position wherein the right/left indicator is no longer centered, the OBS control knob can be operated in a manner such that the right/left indicator will again be centered. When this action occurs, the course selector dial will provide an indication of the radial along which the aircraft position simulator arm lies.

In accordance with still further principles of this invention, a graphical representation similar to the face of a VOR receiver is provided. The graphical representation includes dummy knobs directed to tuning navigational and communication frequencies. Further, the OBS control knob is located in an appropriate position on the graphical representation and is movable inwardly and outwardly, said movement moving an associated gear from one of said mechanical linkages to the other of said mechanical linkages. In addition, the right/left or course deviation indicator is a needle that is mounted on the graphical representation. Moreover, a second graphical representation having a center point representing the location of a VOR transmitter is provided. The aircraft position simulator arm is radially movable about said center point to simulate radial aircraft movement about a VOR transmitter. Further, the aircraft position simulator arm includes a slot within which is mounted an aircraft model. The aircraft model is rotatable through 360° also. Thus, the position of the aircraft model along the aircraft position simulator arm can be varied to simulate aircraft movement toward or away from the simulated VOR transmitter. In addition, the orientation of the aircraft model (i.e. the direction in which it is pointed) can be simulated.

In accordance with other principles of this invention, the first mechanical linkage comprises a first gear train and the second mechanical linkage comprises a second gear train. Preferably, all of the gears of both gear trains are of the same diameter and include the same number of teeth. Moreover, one of the gears of each train is common. The common gear is movable between the two gear trains by inward/outward movement of the OBS control knob.

In accordance with still further principles of this invention, the right/left or course deviation indicator needle includes a cam follower that coacts with a cam formed in combination with one of the gears forming said first train, said gear being coupled to said second gear train so that when either of said gear trains is moved by either of said OBS control knob or said aircraft position simulator arm, said right/left indicator needle moves.

In accordance with still further principles of this invention, all of said gears are generally flat planar gears mounted in a flat housing formed of top and bottom plates. Said top and bottom plates are formed in a similar manner, as are said gears. Said similar forming allows the apparatus of the invention to be inexpensively manufactured from plastic and the like since only one die is needed for the top and bottom plates, and a second die for the gears.

It will be appreciated from the foregoing brief summary that the invention comprises a navigational instruction device suitable for use in training pilots. The navigational instruction device not only stimulates the display changes which occur on the display indicators of a VOR receiver, but also displays the movement of the aircraft which causes such display changes. Hence, the pilot is graphically informed of what happens to the VOR receiver when his aircraft moves. Moreover, he is graphically informed of what display changes occur as he moves the OBS control knob to "align" the VOR receiver with a simulated aircraft position. Not only is the apparatus of the invention suitable for both classroom and individual student instruction, in one form, it is also suitable for use in the cockpit of an aircraft by pilots as well as students to provide a localized display of aircraft position for a particular VOR receiver display. Because the individual use form of the apparatus of the invention is inexpensive to manufacture and produce from plastic and the like, it is suitable for widespread use. Consequently, the invention overcomes many of the prior art problems noted above.

BRIEF DESCRIPTION OF THE DRAWINGS

The foregoing objects and many of the attendant advantages of this invention will become readily appreciated as the same becomes better understood by reference to the following detailed description when taken in conjunction with the accompanying drawings wherein:

FIG. 2 is an expanded cross-sectional longitudinal diagram of the preferred embodiment of the invention illustrated in FIG. 1;

FIG. 3 is a cross-sectional view along line 3—3 of FIG. 2;

FIG. 4 is a perspective view of an aircraft position shaft suitable for use in the embodiment of the invention illustrated in FIG. 1;

FIG. 5 is a cross-sectional view along line 5—5 of FIG. 2;

FIG. 6 is a cross-sectional view along line 6—6 of FIG. 2;

FIG. 7 is a cross-sectional diagram along line 7—7 of FIG. 6;

FIG. 8 is a slightly more detailed cross-sectional view similar to FIG. 6 showing the elements illustrated therein in a different position;

FIG. 9 is a cross-sectional diagram along lin 9—9 of FIG. 2;

FIG. 10 is a cross-sectional diagram along line 10—10 of FIG. 9;

FIG. 11 is a perspective view of a double key coupler suitable for use in the embodiment of the invention illustrated in FIG. 1;

FIG. 12 is a front view of a support plate suitable for use in an alternate embodiment of the invention;

FIG. 13 is an edge view of the support plate illustrated in FIG. 12;

FIG. 14 is a cross-sectional view of a sprocket arrangement suitable for use with support plate illustrated in FIG. 12;

FIG. 15 is a top view of the sprocket arrangement illustrated in FIG. 14;

FIG. 16 is a front view of a position indicator scale suitable for mounting on the support plate illustrated in FIG. 12;

FIG. 17 is an edge view of the indicator plate illustrated in FIG. 16;

FIG. 18 is a front view of an aircraft position simulator arm suitable for use by the alternate embodiment of the invention;

FIG. 19 is a mechanical view of an alternate mechanical linkage suitable for use by the alternate embodiment of the invention;

FIG. 20 is an expanded view of the alternate mechanical linkage along lines A-B-C-D-E-F-G of FIG. 19;

FIG. 21 is a parts view of a right/left needle shaft and lever arm suitable for use by the alternate embodiment of the invention;

FIG. 22 is a parts view of a coupling shaft and lever arm suitable for use by the alternate embodiment of the invention;

FIG. 23 is a side view of a coupling rod suitable for use by the alternate embodiment of the invention;

FIG. 24 is a side view of an OBS control shaft and gear suitable for use by the alternate embodiment of the invention;

DESCRIPTION OF THE PREFERRED EMBODIMENT

Figure 1:
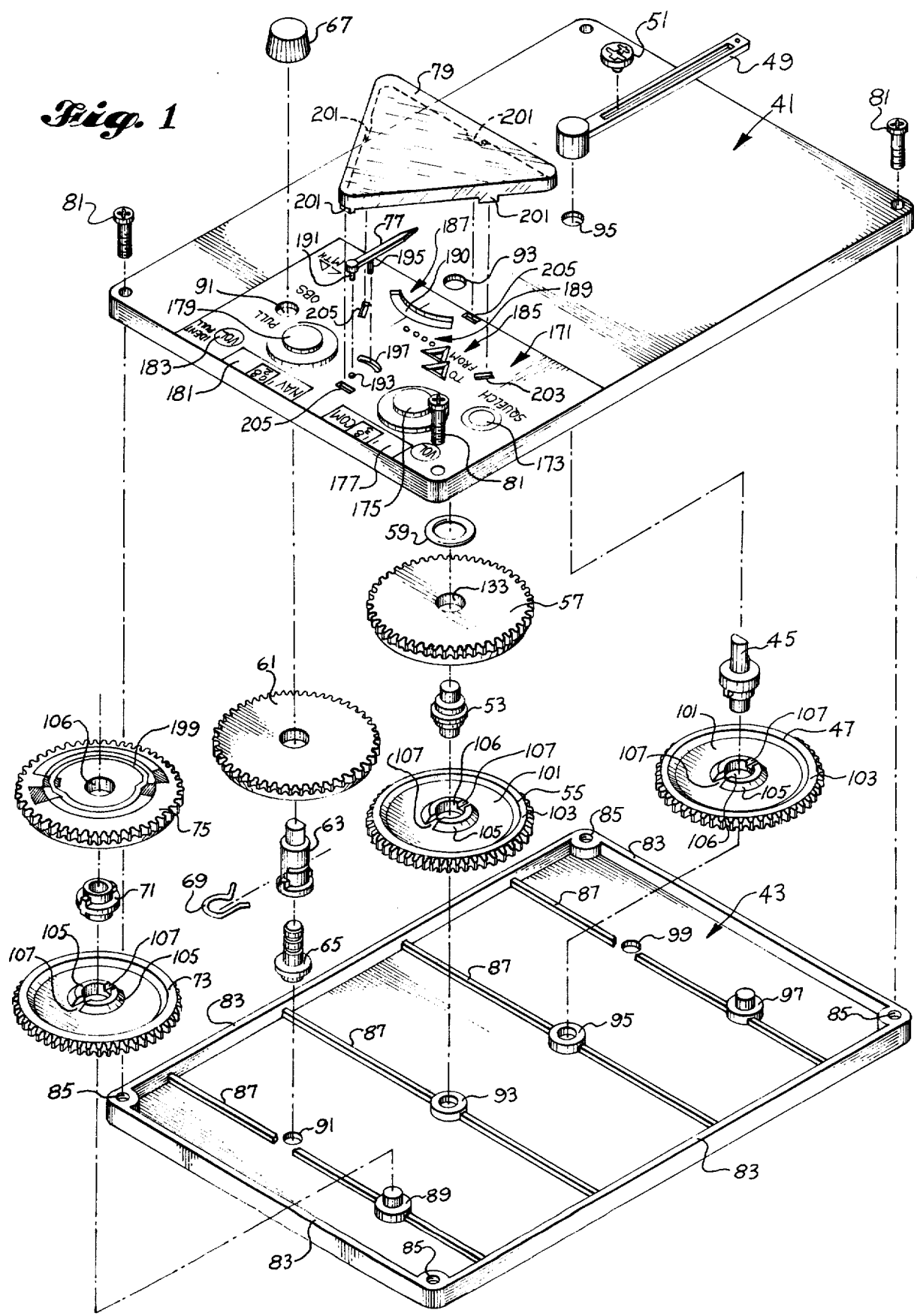
FIG. 1 is an exploded view illustrating a preferred embodiment of the invention.

FIG. 1 illustrates a preferred embodiment of the invention and comprises: a housing comprising a top plate 41 and a bottom plate 43; an aircraft position shaft 45; an aircraft position gear 47; an aircraft position simulator arm 49; and an aircraft model 51; a course selection shaft 53; an idler gear 55; a course selection gear 57; an O-ring 59; an OBS gear 61; an OBS shaft 63; an OBS lock shaft 65; an OBS knob 67; a detent pin 69; a keyed coupler shaft 71; a coupling gear 73; a to/from, right/left gear 75; a needle 77; and, a triangular cover plate 79.

The top plate 41 and the bottom plate 43 are attached together by four screws 81, located at each of the four corners of the plates. When the top and bottom plates are attached together by the four screws, they define a generally flat, rectangular space. Located inside of the flat, rectangular space are the various gears and shafts, as hereinafter described.

Preferably, the top and bottom plates are formed of plastic and are formed in a similar manner by a common die. Thereafter, apertures are formed in one of the plates so that it can be utilized as a top plate and include the VOR receiver display hereinafter described. Alternatively, a split molding technique can be used to form the top and bottom plates.

As illustrated in FIG. 1, the top and bottom plates are surrounded by raised edges 83 having reinforced corners 85 through which the screws 81 pass. The raised edges 83 face one another when the top and bottom plates are attached together. Located parallel to and between two of the opposing raised edges, defined as the ends, are four reinforcing ridges 87.

Along the first reinforcing rib 87 (running from left to right as illustrated in FIG. 1), intermediate the ends thereof, is a first cylindrical stud 89 and a first cylindrical aperture 91. The first aperture 91 is slightly offset from the first reinforcing ridge 87. Located along the second and third reinforcing ridges 87, intermediate the ends thereof, are first and second raised rings 93 and 95. The first stud 89, the first aperture 91 and the first and second raised rings 93, 95 are arrayed such that they support shafts which allow the various gears when mounted on the shafts to cooperate in the hereinafter described manner. Located along the fourth reinforcing rib 87 is a second cylindrical stud 97 and a second cylindrical aperture 99. The second stud and the second aperture are not utilized in the illustrated embodiment of the invention. These elements are provided so that the bottom plate 43 illustrated in FIG. 1 includes all of the elements necessary to allow it to form a top plate 41. That is, if the bottom illustrated in FIG. 1 is inverted it can be utilized to form the top 41, assuming suitable additional apertures are formed therein. The suitable additional apertures can be formed using a split molding technique wherein the mold includes an insert that forms the apertures when the top plate is to be formed. When a bottom plate is to be formed the insert is a blank. In addition to the apertures, other items, such as raised dummy knobs etc., can be formed in the top plate 41 at the same time.

Preferably, all of the gears, including the aircraft position gear 47, the idler gear 55, the course selection gear 57, the OBS gear 61, the coupling gear 73, and the to/from, right/left gear 75 are spur gears and are formed in a similar manner from a suitable plastic or nylon material. One side of these gears is flat and the other side is undercut whereby a central region 101 surrounded by a raised edge 103 is formed. Located in the center of the central region 101 is a collar 105 in the form of a truncated cone. The collar 105 surrounds a shaft hole 106 and includes opposing slots 107 which cooperate with keys formed in the hereinafter described shafts to lock the gears to the associated shaft, if the associated shaft is keyed. If the associated shaft is not keyed, the gear is free to rotate with respect to it.

As illustrated in FIG. 4, the aircraft position shaft 45 includes a cylindrical lower end 109. This lower end, as illustrated in FIG. 3 is mounted in the second raised ring 95. Located above the lower end of the aircraft position shaft 45 is a keyed collar 111. The keyed collar 111 passes through the shaft hole 106 in the aircraft position gear 47 so that its keys lie in the key slots 107. In this manner, the aircraft position shaft is keyed to the aircraft position gear so that when the aircraft position shaft is rotated, the aircraft position gear is also rotated or vice versa. Located above the keyed collar 111 is stop collar 113 having a diameter slightly larger than the diameter of the keyed collar 111. Located above the stop collar 113 is a cylindrical upper end 117. The cylindrical upper end 117 is mounted in the second raised ring 95 of the upper plate 41. The stop collar prevents the aircraft position shaft from moving upwardly through the raised ring. The cylindrical upper end 117 projects above the upper plate 41 and is flat cut 119 on one side of its upwardly projecting part. The upwardly projecting part is mounted in a corresponding flat cut semi-cylindrical aperture 121 formed in one end of the aircraft position simulator arm 49. Thus, when the aircraft position simulator arm 49 is moved, the aircraft position shaft 45 is moved which, in turn, moves the aircraft position gear 47. Alternatively, if the aircraft position gear 47 is moved, this movement is translated through the aircraft position shaft 45 to the aircraft position simulator arm 49. Preferably, the aircraft position simulator arm is removable from the aircraft position shaft 45 to allow an aircraft sectional map to be placed on the upper surface of the top plate 41 beneath the aircraft position simulator arm. A VOR transmitter location on such an overlay map will be coincident with the longitudinal axis of the aircraft position shaft 45. Alternatively, a scratch pad card can be placed in the same position to allow a pilot or student pilot to draw approaches, holding patterns, radials, etc., for training purposes. Preferably, a spring clip (not shown) holds the aircraft simulator arm to the aircraft position shaft.

As will be better understood from the following description, the longitudinal axis of the aircraft position shaft 45 defines or simulates the position of a VOR transmitter. Therefore, the aircraft position simulator arm 49 is movable through the radials radiating from by the simulated VOR transmitter. The aircraft model 51 which in essence is a "button" having an aircraft display formed in its upper surface is movable back and forth in a slot 123 (FIG. 3) formed in the aircraft position simulator arm 49. In addition, the aircraft model is rotatable. Thus, the aircraft model can be moved to a simulated position along the arm 49 and pointed in any desired simulation direction.

The course selection shaft 53 (FIG. 5) comprises two cylindrical ends which are mounted in the first raised rings 93. Moving inwardly from the cylindrical ends are upper and lower collars 125 and 127 separated by a center collar 129 having a diameter slightly larger than the upper and lower collars 125 and 127. The upper and lower collars 125 and 127 are not keyed. The upper collar passes through the shaft hole 106 in the course selection gear 57 and the lower collar passes through the shaft hole in the idler gear 55. Thus, these gears are mounted on the course selection shaft 53, but are not key coupled to that shaft. Because these gears are not key coupled to the course selection shaft 53, they are free to rotate with respect to that shaft. In order to prevent friction from moving the course selection gear 57 when the idler gear 55 is moved in the manner hereinafter described, the O-ring 59 is pressed between the upper surface of the course selection gear 57 and the upper plate 41.

The OBS lock shaft 65 is basically a stud which includes a cylindrical lower end 135 mounted in the first cylindrical aperture 91. A collar 137 surrounds the cylindrical lower end 135 and prevents the OBS lock shaft from sliding through the lower plate 43. Projecting upwardly from the collar 137 is a shaft 139 which includes two circular indentations, an upper circular indentation 141 and a lower circular indentation 143, best viewed in FIG. 8. The circular indentations 141 and 143 cooperate with the detent pin 69 in a manner hereinafter described.

The OBS shaft includes a longitudinal central aperture 145 adapted to slide over the shaft 139 forming part of the OBS lock shaft 65. The OBS shaft 63 also includes a slot 147 formed at a right angle to the longitudinal axis of the OBS shaft. The slot 147 communicates with the longitudinal central aperture 145. The detent pin 69 which has a silhouette similar to an "R", includes a leg 149 which lies in the slot 147. The lower surface of the OBS shaft 63 includes an outwardly projecting collar 151. The OBS shaft 163 passes through the shaft hole 106 in the OBS gear in a manner such that the OBS gear 61 is keyed to the OBS shaft by a key projection 153 (FIG. 6) which projects outwardly from the OBS shaft 63 above the collar 151 and lies in the slots 107 formed in the OBS gear 61.

The upper portion of the OBS shaft 63 passes through the first cylindrical aperture 91 formed in the upper plate 41. The upper end of the OBS shaft is undercut to form a smaller diameter cylinder 155 that is flat on one side. The OBS control knob 67 includes a corresponding "flat cut" cylindrical aperture that allows it to be affixed to the upper end of the OBS shaft in a manner such that it is adapted to rotate the OBS shaft 63.

It will be appreciated from viewing FIGS. 6–8, and the foregoing description, that the OBS control knob 67, in addition to rotating the OBS gear 61, also moves the OBS gear with respect to the lock shaft 65. More specifically, the OBS gear 61 can be moved between two positions, one position being shown in solid in FIG. 8 and the other position being shown in phantom in FIG. 6. The OBS gear 61 is locked in either of these positions by the leg 149 of the detent pin 69 moving inwardly in the slot 147 into one or the other of the circular indentations 141 and 143 formed in the OBS lock shaft 65.

As best seen in FIG. 11, the coupler shaft 71 is a cylinder formed in a manner such that it can be mounted between the first studs 89 formed in the upper and lower plates 41 and 43. The coupler shaft includes a central collar 157 having a diameter slightly larger than the diameter of the upper and lower ends 158 and 159. The upper and lower ends pass through the shaft holes 106 in the to/from, right/left gear and the coupling gear, respectively. Upper and lower keys 161 and 163 project outwardly from the upper and lower ends 158 and 159, respectively, of the coupler shaft 71. The keys lie in the key slots formed in the to/from, right/left gear and the coupling gear. Thus, the to/from, right/left gear and the coupling gear are keyed together in a manner such that if one of these gears rotates the other also rotates.

FIG. 2 illustrates that the aircraft position gear is mounted so as to mesh with the idler gear. The idler gear meshes with the OBS gear, if the OBS gear is in its "lower" position, as illustrated in FIG. 2. In addition, if the OBS gear is in its lower position, it meshes with the coupling gear 73. When the OBS gear is in its upper position, it meshes with both the to/from, right/left gear 75 and the course selection gear 57.

When the OBS gear is in its upper position and the OBS knob 67 is rotated, the course selection gear rotates as does the to/from, right/left gear. Because the to/from, right/left gear rotates, the coupling gear also rotates. When the OBS knob is in its lower position, the OBS gear rotates the coupling gear which in turn rotates the to/from, right/left gear. In addition, when the OBS gear is in its lower position and is rotated, it also rotates the idler gear which in turn rotates the aircraft position gear. Rotation of the aircraft position gear causes rotation of the aircraft position simulator arm 49. This type of rotation can be also reversed, i.e., rotation of the aircraft position simulator arm 49, when the OBS knob is in its lower position, can be translated into rotation of the to/from, right/left gear 75. Alternatively, if the OBS knob is in its upper position when the aircraft position simulator arm 49 is rotated, only the idler gear rotates.

Formed in the upper surface of the upper plate 41, in the lower left-hand corner as illustrated in FIG. 1, is a VOR display 171. The VOR display may be scribed, embossed or hot stamped into the upper surface of the upper plate 41 or may be created thereon in any other suitable manner, such as by painting, decal, etc. The VOR display 171 includes all of the normal instruments associated with a standard VOR display. Thus, the display includes: a squelch control knob 173; a communication control knob 175; a communication frequency display 177; a navigational frequency control knob 179; a navigational frequency display 181; and, a volume control knob 183. All of these displays are "dummy" displays. That is, they are not operative in any manner and are merely provided to illustrate the existence of their associated actual controls to the student or pilot using the device of the invention. There are, however, operative displays included as part of the VOR display 171.

The operative displays forming a part of the VOR display are a to/from display 185; a course display 187 and a right/left display 189. The to/from display comprises two apertures identified by the words TO and FROM. These apertures are located such that the periphery of the upper surface of the to/from, right/left gear 75 can be viewed through these apertures, as hereinafter described.

The course display 187 comprises a semi-circular aperture 190 formed through the upper plate 41 and located such that the periphery of the upper surface of the course selection gear 57 can be viewed through the aperture. The periphery of the course selection gear is divided into 360°, as illustrated in FIG. 2. More specifically, the upper surface periphery of the course selection gear divided at 360° circle into twelve 30° sections identified by the numbers 0, 3, 6, 9, 12, 15, 18, 21, 24, 27, 30, 33 to designate 0°, 30°, 60°, etc; and, hash marks to represent the two 10° increments in each 30° section. It should be noted that the last zero of the course numbers has been left off because such deletion is common in the aircraft navigation field.

The right/left display 189 comprises the needle 77 and a plurality of spaced dots past which the needle is adapted to swing. More specifically, the needle 77 is rotatably attached to the upper plate by a pin 191 projecting into an aperture 193 formed in the upper plate 41. In addition, a leg 195 which acts as a cam follower and is located at some point between the ends of the needle 77 projects downwardly, as viewed in FIG. 1, through an aperture 197 formed in the upper plate 41. The aperture 197 is located on or adjacent to an imaginary line running between the arcs of the OBS shaft 63 and the coupler shaft 71. The cam follower 187 cooperates with a depressed cam region 199 formed in the upper surface of the to/from gear 75 in the manner hereinafter described.

The needle 77 is covered and held in place in the aperture 193 by the triangular cover plate 79. The triangular cover plate 79 is transparent and includes a plurality of legs 201 located at suitable points about its periphery. The legs 291 fit into slots 203 and 205 formed at suitable points in the upper surface of the upper plate 41. The legs and slots maintain the triangular cover plate 79 in its covering position without inhibiting oscillation movement of the needle 77.

FIG. 2 illustrates the graphics on the upper surface of the to/from, right/left gear 75. These graphics cooperate with the TO and FROM apertures in the upper plate 41 to create the to/from display 185. The graphics may be formed in the upper surface of the gear in any suitable manner, such as painting through templates, hot molding, etc. The graphics comprise an outer ring 207 located about the periphery of the upper surface of the to/from, right/left gear 75 and an inner ring 208 located just inside of the outer ring 207. Both rings are broken into different colored sections. One section is dark (black) and a second is light (white). The other two sections are dark and light combinations (cross-hatched). The sections are arcuate in nature and occur in angular portions defined by the letters *a, b, c, d, e* and *f* in FIG. 2. These angles start from a base radial 209 and move in a counter clockwise direction in the order set forth. Preferably angles *a, c, d,* and *f* cover arcs of approximately 15°, and angles b and e cover arcs of approximately 150°. In the outer ring, the section covered by angle *a* is cross-hatched, the section covered by angles *b* and *c* is black, the section covered by angle *d* is cross-hatched, and the section covered by angles *e* and *f* is white. In the inner ring, the section covered by angles *a* and *b* is white, the section covered by angle *c* is cross-hatched, the section covered by angles *d* and *e* is black, and the section covered by angle *f* is cross-hatched.

As set forth above a face or depression cam 199 is also formed in the upper surface of the to/from, right-/left gear 75. This cam is followed by the cam follower 195 forming a part of the needle 77. The cam depression is also described with respect to the angles identified by the numbers, *a, b, c, d, e* and *f*, arrayed in the manner described above. However, preferably, in the case of the cam depression, angles *a, c, d* and *f* are 20° and angles *b* and *e* are 140°. Basically, the cam depression is formed of two circular arcs of different diameters joined by dogleg sections. The larger diameter arc lies in the arcuate section defined by angle *b* and in the white portion of the inner graphic 208. The smaller diameter arc lies in the arcuate section defined by angle *e* and just inside of the black portion of the inner graphic 208. Thus, the dogleg sections are located in the arcs defined by angles *a* and *f*, and *c* and *d* respectively.

Turning now to a description of the operation of the embodiment of the invention illustrated in FIGS. 1–11; initially the invention must be adjusted so that it will accurately operate in the desired manner. While the steps for adjusting the invention can be performed in different sequences, in accordance with one sequence, the OBS knob 67 is pulled out and rotated until the right-/left or course deviation indicator (CDI) needle 77 centers with the white section of the outer graphic ring 207 viewable through the FROM aperture, and the black section of the inner graphic 208 viewable, simultaneously, through the TO aperture. Thereafter, the aircraft position simulator arm 49 is moved to a corresponding radial formed on an XY coordinate system (not illustrated) located on the upper surface of the upper plate 41. Thus, the aircraft model 51 is illustrated as located along the corresponding radial, and may be positioned so as to depict flying from the simulated VOR transmitter. The aircraft position simulator arm and the from aircraft model display confirm the course selection display, the centered needle, and the from information. The OBS knob is then depressed and the apparatus of the invention is ready for instructional operation.

Assuming that it is desired to view the changes that occur on a VOR receiver display when the aircraft 51 moves from its radial position, the aircraft position simulator arm is moved. This action causes the aircraft to radially move around the simulated location of the VOR transmitter located at the pivot point of the aircraft position simulator arm 49, as previously described. As the aircraft position simulator arm is moved, the aircraft position gear 47 through the idler gear and the OBS gear causes the coupling gear to rotate. Rotation of the coupling gear causes the CDI needle 77 to move from its centered position, either to the right or to the left, depending upon the direction of rotation of the aircraft position simulator arm 49. As the arm continues to move, the to/from display changes. First cross-hatched graphics are viewable through the TO and FROM apertures. This occurs when the arm is near or at a radial 90° to the indicated radial. This is the standard "off" indication designating the 90° situation, i.e., the aircraft is 90° with respect to the chosen radial. Thereafter, the to/from display reverses i.e. the TO aperture displays a white graphic and the FROM aperture displays a black graphic. In this manner, the VOR display of the invention is changed in the same manner as the display of an actual VOR receiver would change if its associated aircraft were moving in a similar manner through the radials projecting outwardly from a VOR transmitter whose signal is being received.

Assuming the simulated aircraft 51 has been moved in the manner previously described to some new position, and it is desired to determine what course setting is necessary to fly to or from the simulated VOR transmitter point, the OBS knob is pulled out. The OBS knob is then rotated until the needle (right/left) again becomes centered with respect to the dots. When this occurs, the course selector display provides the desired course setting information. A white graphic in the TO or FROM aperture indicates whether the course is to or from the transmitter. If an indication of to or from the opposing course is desired, the OBS knob is rotated further until the graphics reverse and the needle is centered, as is well known in the art.

At this point it should be noted that the "white" indication is the actual information indication and black is the reverse or "not" indication. However, if desired, this designation could be reversed or different colors used. However, a white information indication, which contrasts with a black or dark housing is preferred. Also, the maximum needle deflection for a related "right/left error" can vary over a wide range. For instruction purposes 20° off-course/maximum deflection is preferred, even though actual VOR receivers normally use 10° off-course/maximum deflection as a standard.

The embodiment of the invention illustrated in FIGS. 1–11 essentially is a "hand held" embodiment suitable for purchase and use by individual pilots and student pilots. Not only is it suitable for training student pilots in the use of VOR receivers, it is also suitable for use by pilots or student pilots in the cockpit of an aircraft to graphically display to the pilot or student pilot the position of an aircraft with respect to a transmitter under a predetermined set of VOR display conditions. That is, when the VOR instruction device of the invention has its VOR display set to reflect exactly the same characteristics of a VOR receiver, it will display the same radial position of the aircraft as it actually exists with respect to an actual VOR transmitter. In this regard, if desired, as indicated above a VOR map can be mounted beneath the aircraft position simulator arm to provide an even truer display and from which visual reference points can be selected for visual comparison. Hence, this embodiment of the invention is suitable for relatively widespread use.

An alternate embodiment of the invention is illustrated in FIGS. 12–30. The alternate embodiment of the invention, rather than being suitable for individual student and/or pilot use, is adapted for classroom use so that an instructor can display changes that occur when an aircraft is moved with respect to a VOR transmitter.

FIG. 12 illustrates a support panel 301 suitable for mounting on the wall in front of a classroom. The support panel 301 includes an inlet region 303 located in its upper right-hand corner as viewed in FIG. 12. As will be better understood from the following description, a VOR display structure is mounted in the inlet region 303.

Located in the center of the support panel 301 and passing therethrough is a shaft 305, located about the shaft 305 is a display graphic 307. The display graphic may contain any suitable display as hereinafter described. Attached to the shaft 305 and lying above the display graphic 307 is an aircraft position simulator arm 309.

Located on the other side of the panel, in the back thereof as seen in FIG. 13, is a housing 311. The housing 311, as best seen in FIGS. 14 and 15 includes a pair of spaced plates 313 and 315. Mounted between the spaced plates 313 and 315 is a sprocket 317 affixed to the shaft 305. Thus, when the shaft 305 is rotated the sprocket 317 rotates and vice versa.

A suitable graphic display 307 is illustrated in FIG. 16. Preferably, the graphic display is a reproduction of a part of a standard sectional aeronautical chart and includes a VOR transmitter located at the center 319 of the display 307. In other words, the graphic display is formed such that when mounted on the support panel 301, the VOR transmitter portion of the graphic lies on the axis of the shaft 305. Lines extend outwardly from the center 319 to divide the display into quarters (or smaller sections, as desired).

FIG. 18 illustrates a suitable aircraft position simulator arm 309. The center 323 of the arm 309 is attached by any suitable means, such as a bolt or rivet, to the outer end of the shaft 305.

FIG. 19 illustrates a rear mounting plate 325 for a VOR instrument display. FIG. 20 illustrates the mechanical linkage system lying along a line defined by points A-B-C-D-E-F-G of FIG. 19 mounted between the rear support plate 325 and a front support plate 327. The front support plate, the rear support plate, a display plate (FIG. 29) and a cover plate (FIG. 30) are all attached together in a "separated" sandwich manner and mounted in the inlet region 303 of the support plate 301.

Mounted between the front and rear support plates 327 and 325 on the right side thereof, midway between the top and bottom as viewed in FIG. 19, is a first shaft 329. Affixed to the first shaft 329 is a first pulley 331. The longitudinal axis of the first shaft 329 defines point G.

Mounted between the front and rear support plates is the lower portion of the plates as viewed in FIG. 19, is a second shaft 333. First and second spur gears 335 and 337 are affixed to the second shaft 333. The first spur gear 335 lies near the front support plate 327 and the second spur gear lies near the rear support plate 325. The longitudinal axis of the second shaft defines point F in FIG. 19.

Mounted between the front and rear support plates and located immediately to the left of the second shaft, as viewed in FIG. 19, is a third shaft 339. Mounted on the third shaft 339, in a rotatable manner near the front support plate 327 is a third spur gear 341. The third spur gear 341 is meshed with the first spur gear 335. Affixed to the third shaft 339 beneath the third spur gear 341 is a second pulley 343. The second pulley is aligned with the first pulley 331 and is connected thereto by a belt 345. Affixed to the third shaft 339 beneath the second pulley 343 is a fourth spur gear 347. Mounted on the third shaft 339, in a rotatable manner beneath the fourth spur gear 347 is a fifth spur gear 349. The fifth spur gear 349 meshes with the second spur 337. The longitudinal axis of the third shaft 339 defines point E.

A fourth shaft 349 is also mounted between the front and rear support plates 327 and 325, just above the third shaft as viewed in FIG. 19. The fourth shaft 349 is movable along its longitudinal axis between three positions defined by three detents 351 formed at separated points along the shaft. The detents 351 cooperate with a spring 353 attached to the front support plate 327 about the aperture through which the fourth shaft 349 passes. Affixed to the fourth shaft 349 is a relatively wide sixth spur gear 355. The sixth spur gear 355 is adapted to mesh with the third, fourth and fifth gears mounted on the third shaft 339, depending upon the "detent" position of the fourth shaft. The longitudinal axis of the fourth shaft 349 defines point D.

A fifth shaft 357 is also mounted between the front and rear support plates 327 and 325, immediately to the left of the fourth shaft, as viewed in FIG. 19. Rotatably mounted on the fifth shaft 357, adjacent to the front support plate 327, is a second sprocket 359. The second sprocket 359 is attached by a suitable sprocket chain (not shown) to the sprocket 317 mounted in the housing 311 located at the center of the support panel 301. Also rotatably mounted on the fifth shaft 357, beneath the second sprocket 359 is a seventh spur gear 361. The seventh spur gear is affixed to the second sprocket and meshes with the fifth spur gear 355, if the fifth spur gear is in a suitable position. Rotatably mounted on the fifth shaft 357 beneath the seventh spur gear 361 is an eighth spur gear 363 which also meshes with the fifth spur gear 355, depending upon the position of the fifth spur gear. Rotatably mounted on the fifth shaft 357 beneath the eighth spur gear 363, and affixed to the eighth spur gear, is a third sprocket 365. The longitudinal axis of the fifth shaft 357 defines point C.

A sixth shaft 367 is located above the fifth shaft, as viewed in FIG. 19, and projects upwardly from the rear support plate 325 but does not reach the front support plate 327. Affixed to the sixth shaft 367 is a fourth sprocket 369. The fourth sprocket 369 is coupled to the third sprocket 365 mounted on the fifth shaft 357 by a sprocket chain 371 (FIG. 19). Affixed to the upper end of the sixth shaft 367 by a set screw 373 is a first lever arm 371. The first lever arm 371 includes an outer aperture 375. The longitudinal axis of the sixth shaft 367 defines a point B.

A seventh shaft 377 is mounted between the front and rear support plates 327 and 325 to the right of and below the sixth shaft as viewed in FIG. 19. The seventh shaft has affixed to it a second lever arm 379. The second lever arm 379 is affixed to the seventh shaft 377 by a set screw 381. The second lever arm 379 also includes an outer aperture 383. The outer aperture 383 and 375 are connected together by a connecting rod 385 (FIG. 23). The longitudinal axis of the seventh shaft 377 defines point A.

The first, second, fourth and seventh shafts are mounted for rotation in the front and rear support plates 327 and 325. The sixth shaft is mounted for rotation in the rear support plate 325. The third and fifth shafts are affixed to the front and rear support plates 327 and 325, by pressing them into suitable apertures, for example.

Figure 25:
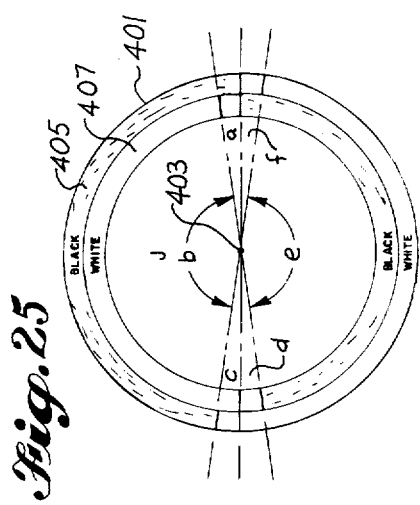
FIG. 25 is a front view of a to/from dial suitable for use by the alternate embodiment.
Figure 26:
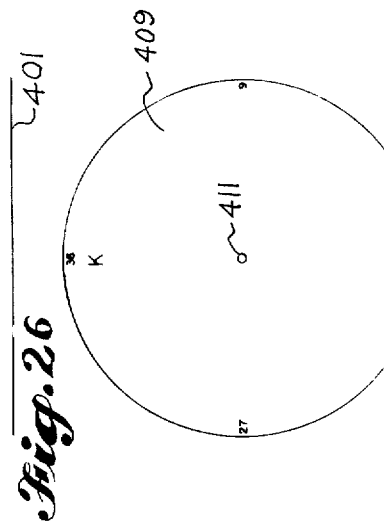
FIG. 26 is an edge view of the to/from dial illustrated in FIG. 25.

FIGS. 25 and 26 illustrate a circular to/from dial 401 suitable for attachment to the upper end of the first shaft by any suitable means such as a bolt passing through an aperture 403 in the dial and then into a threaded aperture in the first shaft. The to/from dial 401 includes an outer graphic region 405 located about its periphery on one side, and an inner graphic region 407 located just inside of the outer graphic region 405. The graphic regions are broken into six arcuate sections for purposes of discussion. These sections are similar to the sections illustrated in FIG. 2, except there are no cross-hatched sections, rather the sections are all either light (white) or dark (black). As with FIG. 2, the arcuate sections are defined in counterclockwise order by the letters $a, b, c, d, e$ and $f$. Preferably angles $a, c, d$ and $f$ are 15° and angles $b$ and $e$ are 150°. The sections of the outer graphic region 405 defined by angles $a$ and $b$ are black and the remainder are white. The sections of the inner graphic regions defined by angles $e$ and $f$ are black and the remainder are white.

Figure 27:
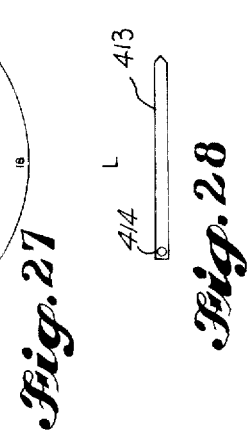
FIG. 27 is a front view of an OBS dial suitable for use by the alternate embodiment of the invention.

FIG. 27 illustrates an OBS dial 409. The OBS dial includes a central aperture 411 which allows it to be affixed to the front end of the second shaft 333 by a screw threaded into a suitable aperture formed in the upper end of the second shaft 333. The periphery of one side of the OBS dial is divided into degrees illustrated schematically by the numbers 9, 18, 27 and 36 to designate 90°, 180°, 270° and 360° (or 0°). Although not shown, other suitable intermediate degree designations, as would normally occur on a course selection indicator, are included between these illustrations.

Figure 28:
FIG. 28 is a front view of an indicator needle suitable for use by the alternate embodiment of the invention.

FIG. 28 illustrates a needle 413 suitable for attachment to the front end of the seventh shaft 377 by a screw or bolt passing through an aperture 414 in the one end of the needle and then into a suitable threaded aperture in the seventh shaft. The needle 413 generally projects downwardly from the axis of the seventh shaft, as viewed in FIG. 19.

Figure 29:
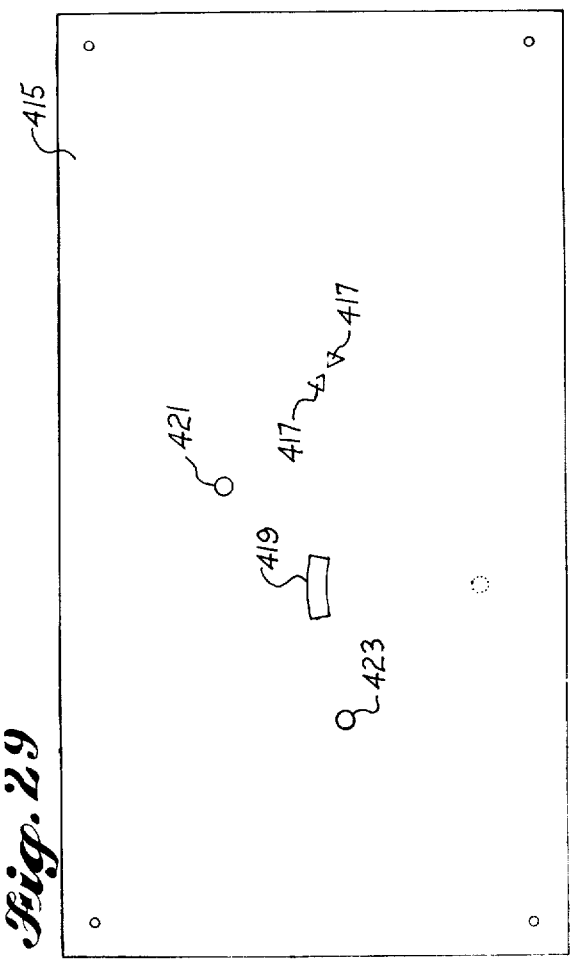
FIG. 29 is a front view of a display plate suitable for use by the alternate embodiment of the invention; and, FIG. 30 is a front view of a cover plate suitable for use by the alternate embodiment of the invention.

Located above the OBS and to/from dials, but below the needle 413 is the display plate 415 illustrated in FIG. 29. The display plate includes to/from apertures 417 located such that the inner and outer graphic regions on the to/from dial 401 are viewable as the dial is rotated. In addition, an arcuate course selection aperture 419 is formed in the intermediate plate 415 and located such that the degree indications located around the periphery of the course selection dial 409 are viewable therethrough. In addition, the display plate 415 includes a first circular aperture 421 aligned with the seventh shaft 377 and a second circular aperture 423 aligned with the fourth shaft 349. Thus, when the display plate 415 is mounted above the front plate 327, the fourth and seventh shafts pass through the display plate.

Figure 30:
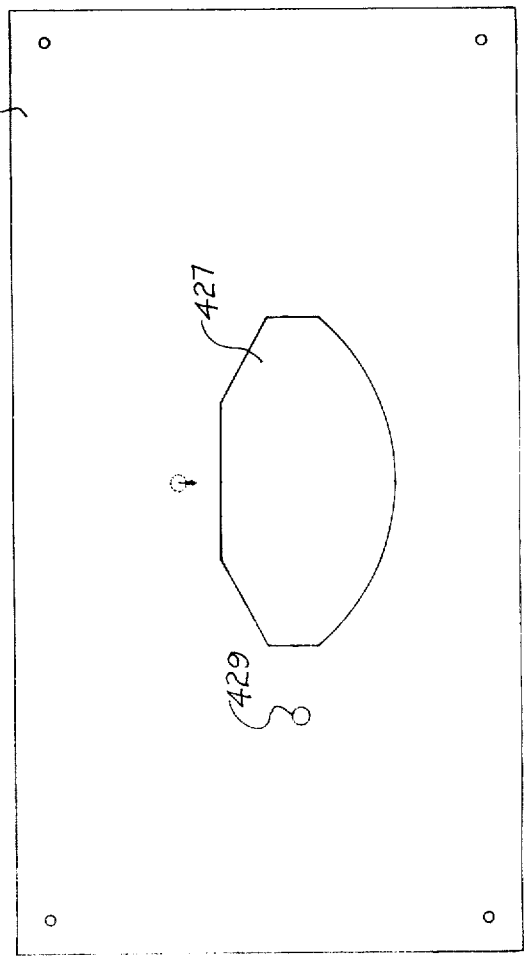

Mounted above the display plate 415 is a cover plate 425 of the type illustrated in FIG. 30. The cover plate 425 includes a large aperture 427 formed such that, when the cover plate is mounted above the display plate, the needle, the to/from apertures 417 and the course selection aperture 419 are viewable therethrough. Suitable indicia cooperate with the needle 413 so as to provide right/left display information as the needle moves. In addition, the cover plate 425 includes a second aperture 429 through which the fourth shaft 349 projects. Attached to the outer end of the fourth shaft 349 is an OBS control knob (not shown). Also included, but not shown, are dummy displays of the type illustrated in FIG. 1 and heretofore described.

For alignment purposes the OBS control knob pulls the fourth shaft 349 out as far as possible. The OBS dial is then rotated until a predetermined course reading (such as 0°) is centered in the course selection aperture. The fourth shaft is then moved to its intermediate detent position and rotated until the needle is centered. Finally, the fourth shaft is moved in as far as possible and the aircraft position simulator arm is moved to a position on the graphic display 307 where it is aligned with the predetermined course reading. The apparatus is now aligned.

In order to observe the VOR changes that occur when the aircraft position simulator arm is moved, the OBS control knob must position the fourth shaft so that it is centered. In its center position, movement of the aircraft position simulator arm causes movement of the to/from dial and the needle without movement of the course selection dial to cause VOR receiver changes that depict the changes that occur on a VOR receiver display when an aircraft moves from a correct heading. Thereafter, if the fourth shaft is moved to its inmost position, the OBS knob can move the to-from dial so that the needle is brought back to its center position. The resultant reading from the OBS dial designates the radial necessary to be followed by the aircraft to fly to or from the transmitter defined by the center point of the aircraft position simulation arm. Thus, the embodiment of the invention illustrated in FIGS. 12–30 is operative in the same manner as the embodiment of the invention illustrated in FIGS. 1–11.

It will be appreciated from the foregoing description that VOR instructional devices are provided by the invention. The device can simulate what occurs to a VOR receiver display as an aircraft's position changes with respect to a VOR transmitter. In addition, the device can be utilized to display the VOR receiver operation necessary to determine from the VOR receiver the course information necessary to "fly" an aircraft to or from a VOR transmitter. In one form, the device is suitable for individual use by both pilots and student pilots for "out-of-cockpit" training and practice. The same form of the invention is also suitable for use by pilots as well as students in the cockpit of an aircraft to graphically display to the student or pilot the location of the aircraft for a particular VOR receiver display. In a slightly different form, the invention is suitable for use in classrooms to display to students the operation of a VOR receiver and simultaneously the movement of a plane which causes variations in a VOR receiver display. In addition, this same embodiment can be used to demonstrate to students the VOR receiver adjustments necessary to obtain direct information related to the position of an aircraft with respect to a particular VOR transmitter. Training material (map overlays and the like) can be used with either embodiment of the invention. These materials can include a display of an aircraft tracking over a predetermined course to aid in instruction.

In addition to training and assisting pilots, the apparatus of the invention can also be used by ground based aircraft radio stations to assist lost pilots. More specifically, all the operator of the station need do is duplicate the bearing information seen by the lost pilot on his VOR receiver, and rotate the aircraft position simulator arm until he duplicates the CDI and to/from indications. This display is then adequate to at least define the quadrant of a VOR transmitter within which the lost pilot lies, and the operator can then give the pilot a general heading (within 75°) to follow toward (or away from) the VOR transmitter.

It will also be appreciated from the foregoing description that the invention is mechanically uncomplicated and therefore inexpensive. Because it is inexpensive, it is suitable for widespread use. Yet, the invention accurately displays all the information necessary to teach students and display to pilots the information necessary to operate a VOR receiver. In fact, in addition to the information displays described above, the apparatus of the invention also provides a "reverse" information display similar to that obtainable from a VOR receiver.

While preferred embodiments of the invention have been illustrated and described, it will be appreciated by those skilled in the art and others that various changes can be made therein without departing from the spirit and scope of the invention. For example, while all of the gears for the "hand-held" embodiment have been described as being made in a uniform, similar manner, they do not necessarily have to be so made. In addition, while a relatively flat, easy to carry housing has been described for use with the "hand-held" embodiment of the invention, more complex and sophisticated housings can be utilized as desired. Moreover, the "hand-held" embodiment can be converted into a classroom embodiment if desired. All that needs to be done to make this change is to connect the aircraft position shaft 45 via a suitable sprocketchain mechanism to a further shaft mounted in the center of a large display board, the "hand-held" embodiment being mounted in one corner of the same board. Attached to the further shaft is a large aircraft position simulator arm viewable by students seated in the classroom. In this manner another embodiment of the invention somewhat similar to the herein described "classroom" embodiment is formed. Hence, the invention can be practiced otherwise than as specifically described herein.

The embodiments of the invention in which exclusive property or privilege is claimed are defined as follows:

1. A VOR instructional device comprising:
   1. a housing;
   2. a VOR receiver display associated with said housing and including a to/from display, a right/left display and a course selection display;
   3. an aircraft position display associated with said housing and adapted to simulate an aircraft's position along a VOR transmitter radial; and,
   4. a mechanical linkage means mounted in said housing for coupling said VOR receiver display and said aircraft position display together in a manner such that:
      a. a change in the simulated aircraft position on said aircraft position display causes a change in said right/left display and may cause a change in said to/from display; and,
      b. said course selection display can be changed to bring said right/left display to a predetermined display position and provide an indication of the VOR radial on which said simulated aircraft position lies.

2. A VOR instructional device as claimed in claim 1 wherein said mechanical linkage means comprises:
   a first mechanical linkage;
   a second mechanical linkage; and
   a common mechanical linkage movable between said first and
   second mechanical linkages.

3. A VOR instructional device as claimed in claim 2 wherein said common mechanical linkage comprises a spur gear and a shaft, said spur gear being affixed to said shaft, said shaft being movable along its longitudinal axis so as to move said gear between positions of interaction with said first mechanical linkage and interaction with said second mechanical linkage.

4. A VOR instructional device as claimed in claim 3 wherein:
   1. said first mechanical linkage comprises:
      a. an aircraft position gear adapted to be moved as said aircraft position simulation changes;
      b. an idler gear mounted so as to mesh with said aircraft position gear, said idler gear being adapted to mesh with said spur gear; and,
      c. a coupling gear adapted to mesh with said spur gear; and,
   2. said second mechanical linkage comprises:
      a. a course selection gear mounted so as to mesh with said spur gear; and
      b. a to/from, right/left gear mounted so as to mesh with said spur gear.

5. A VOR instructional device as claimed in claim 4 wherein:
   1. said course selection gear and said idler gear are mounted on a common shaft but are free to rotate with respect to one another; and,
   2. said coupling gear and said to/from, right/left gear are mounted on a common shaft and are adapted to rotate together.

6. A VOR instructional device as claimed in claim 5 wherein said spur gear, said aircraft position gear, said idler gear, said coupling gear, said course selection gear, and said to/from, right/left gear are mounted on the shafts in said housing.

7. A VOR instructional device as claimed in claim 6 wherein:
   1. said VOR display includes a dummy display for displaying navigational and communication frequency control knobs as well as other appropriate control information normally associated with a VOR receiver;
   2. said right/left display comprises a needle mounted on said housing for oscillation, said needle including a follower element coupled to said to/from, right/left gear so as to follow the movement of said to/from, right/left gear;
   3. said to/from display comprises a graphical display formed on the upper surface of said to/from, right/left gear and a pair of apertures formed in said housing through which said graphical display can be observed; and,
   4. said course selector display comprises a heading display located about the periphery of said course selection gear and an aperture formed in said housing through which a portion of said heading display can be viewed.

8. A VOR instructional device as claimed in claim 7 wherein said aircraft position display comprises:
an aircraft position simulation arm affixed to an aircraft position shaft, said aircraft position gear being keyed to said aircraft position shaft whereby when said aircraft position simulation arm is moved, said aircraft position gear also moves.

9. A VOR instructional device as claimed in claim 8 including an OBS shaft and an OBS lock shaft, said spur gear being mounted on said OBS shaft and said OBS shaft being mounted on said OBS lock shaft, said lock shaft including at least two indentations and said OBS shaft including a corresponding slot; and, further comprising a detent pin mounted in said slot, said detent pin adapted to move into said indentation in said OBS lock shaft when the slot in said OBS shaft is selectively aligned with said indentations.

10. Apparatus for concurrently creating a simulated aircraft position display and a simulated VOR receiver display related to said simulated aircraft position display, said apparatus comprising:
1. a housing including:
   a. a top plate;
   b. a bottom plate mounted in spaced, separated relationship with respect to said top plate; and,
   c. a simulated VOR receiver display formed in the outer surface of said top plate;
2. coupling means including:
   a. a plurality of shafts supported by said top and bottom plates between said top and bottom plates; and,
   b. a plurality of gears mounted on said plurality of shafts so as to mesh in a predetermined manner;
3. an aircraft position simulator arm mounted on one of said plurality of shafts so as to rotate as said shaft rotates;
4. a needle operatively associated with one of said gears and said simulated VOR receiver display to provide, in conjunction with said simulated VOR receiver display, a simulated right/left display;
5. an OBS indicator operatively associated with one of said gears and said simulated VOR receiver display to provide, in conjunction with said simulated VOR receiver display, a simulated OBS display; and,
6. a to/from indicator operatively associated with one of said gears and said simulated VOR receiver display to provide, in conjunction with said simulated VOR receiver display, a simulated to/from display.

11. Apparatus as claimed in claim 10 wherein said OBS indicator comprises a plurality of degree indications associated with one surface of said one of said gears associated with said OBS indicator and, wherein said simulated receiver display includes an OBS aperture located such that a predetermined portion of said degree indications are viewable therethrough.

12. Apparatus as claimed in claim 11 wherein said to/from indicator comprises graphics carried by one surface of said one of said gears associated with said to/from indicator, and, wherein said simulated VOR receiver display includes TO and FROM apertures located such that a predetermined portion of said graphics are viewable therethrough.

13. Apparatus as claimed in claim 12 wherein said graphics comprise inner and outer rings located on said one surface of said one of said gears associated with said to/from indicator, said inner and outer rings being separated into sections, said sections being visibly different, one of said sections being viewable through said TO aperture and the other being viewable through said FROM aperture.

14. Apparatus as claimed in claim 13 wherein said sections are different colors.

15. Apparatus as claimed in claim 14 wherein said needle includes a cam follower and wherein one surface of said one of said gears associated with said needle includes a surface cam, said needle and gear being mounted so that said cam follower can follow said surface cam as said gear is rotated, said following causing said needle to oscillate between two extreme positions.

16. Apparatus as claimed in claim 15 wherein:
1. said plurality of shafts comprises:
   a. an aircraft position shaft;
   b. a course selection shaft;
   c. an OBS shaft;
   d. an OBS lock shaft mounted on said OBS shaft for longitudinal movement with respect to said OBS shaft;
   e. a coupler shaft; and,
2. said plurality of gears comprises:
   a. an aircraft position gear mounted on said aircraft position shaft so as to rotate with said aircraft position shaft, said aircraft position shaft also being affixed to said aircraft position simulator arm;
   b. a course selection gear rotatably mounted on said course selection shaft;
   c. an idler gear also rotatably mounted on said course selection shaft, said course selection shaft being mounted in a position such that said idler gear meshes with said aircraft position gear;
   d. an OBS gear mounted on said OBS shaft so as to rotate with said OBS shaft, said OBS lock shaft being mounted in a position such that said OBS gear is movable between one position wherein it meshes with said course selection gear and a second position wherein it meshes with said idler gear, as said OBS shaft is moved longitudinally with respect to said OBS lock shaft;
   e. a coupling gear mounted on said coupling shaft so as to rotate with said coupler shaft, said coupling shaft being located such that said coupling gear meshes with said OBS gear when said OBS gear is in said second position; and,
   f. a to/from, right/left gear mounted on said coupler shaft so as to rotate with said coupler shaft and mesh with said OBS gear when said OBS gear is in said one position.

17. Apparatus as claimed in claim 16 wherein said cam and said to/from indicator graphics are both formed in the same surface of said to/from, right/left gear and wherein said OBS indicator degree indications are formed about the outer periphery of one surface of said course selection gear.

18. Apparatus as claimed in claim 10 wherein said to/from indicator comprises graphics associated with one surface of said one of said gears associated with said to/from indicator, and, wherein said simulated VOR receiver display includes TO and FROM apertures located such that a predetermined portion of said graphics are viewable therethrough.

19. Apparatus as claimed in claim 18 wherein said graphics comprise inner and outer rings located on said one surface of said one of said gears associated with said to/from indicator, said inner and outer rings being separated into sections, said sections being identified by different formats, one of said sections being viewable through said TO aperture and the other being viewable through said FROM aperture.

* * * * *